(12) United States Patent
Yasuho et al.

(10) Patent No.: US 8,291,458 B2
(45) Date of Patent: Oct. 16, 2012

(54) DIGITAL BROADCASTING RECEIVER AND DIGITAL BROADCASTING RECEIVING SYSTEM

(75) Inventors: Tsuneki Yasuho, Osaka (JP); Yasuo Masuda, Osaka (JP); Yoshiyuki Sasagawa, Osaka (JP); Terutaka Teshima, Osaka (JP); Hiroshi Aoki, Hiroshima (JP)

(73) Assignee: Panasonic Corporation, Osaka (JP)

( * ) Notice: Subject to any disclaimer, the term of this patent is extended or adjusted under 35 U.S.C. 154(b) by 878 days.

(21) Appl. No.: 12/139,695

(22) Filed: Jun. 16, 2008

(65) Prior Publication Data
US 2009/0049507 A1 Feb. 19, 2009

(30) Foreign Application Priority Data

Jun. 14, 2007 (JP) ................................ 2007-157153

(51) Int. Cl.
*H04N 7/173* (2011.01)
*H04N 7/16* (2011.01)

(52) U.S. Cl. ........... 725/86; 725/105; 725/135; 725/152
(58) Field of Classification Search .................... 725/86, 725/105, 135, 152
See application file for complete search history.

(56) References Cited

U.S. PATENT DOCUMENTS

| | | | | |
|---|---|---|---|---|
| 5,900,916 A * | 5/1999 | Pauley | ............................ | 725/59 |
| 6,275,990 B1 * | 8/2001 | Dapper et al. | ................ | 725/106 |
| 6,707,796 B1 * | 3/2004 | Li | ................................. | 370/254 |
| 7,478,415 B1 * | 1/2009 | Takeuchi | ........................ | 725/42 |
| 7,809,947 B2 * | 10/2010 | Moon | ............................ | 713/175 |
| 2002/0032754 A1 * | 3/2002 | Logston et al. | ................ | 709/219 |
| 2002/0036721 A1 * | 3/2002 | Sato | ............................. | 348/734 |
| 2004/0105545 A1 * | 6/2004 | Khandelwal et al. | ......... | 380/232 |
| 2004/0230881 A1 | 11/2004 | Gwak | | |
| 2005/0076358 A1 | 4/2005 | Yamada | | |
| 2007/0033588 A1 * | 2/2007 | Landsman | .................... | 717/178 |

(Continued)

FOREIGN PATENT DOCUMENTS

JP 2004-343714 12/2004

(Continued)

OTHER PUBLICATIONS

Cedric Monnier, "MHP/OCAP iTV Applications in a Nutshell," May 17, 2006, pp. 1 and 21-33, 2006 JavaOne Conference, Session TS-4255, URL: http://www.blueboard.com/bluray/pdf/javaone_ts4255_v2.pdf.

*Primary Examiner* — Pankaj Kumar
*Assistant Examiner* — Franklin Andramuno
(74) *Attorney, Agent, or Firm* — Wenderoth, Lind & Ponack, L.L.P.

(57) ABSTRACT

A digital broadcast receiver includes an operation mode manager that switches an operation mode to a first mode in which a function is implemented by the downloaded application or a second mode in which a function is implemented by the pre-installed application, and a key delivery module that delivers the key code received from the remote control to the downloaded application or the pre-installed application. When the receiver is in the first mode, the key delivery module delivers the received key code to the downloaded application if the received key code is a key code for the first mode, and delivers the received key code to the pre-installed application if the received key code is a key code for the second mode. When the receiver is in the second mode, the key delivery module delivers the received key code to the pre-installed application.

4 Claims, 11 Drawing Sheets

U.S. PATENT DOCUMENTS

| | | | |
|---|---|---|---|
| 2007/0088820 A1* | 4/2007 | Kwak et al. | 709/224 |
| 2007/0124796 A1* | 5/2007 | Wittkotter | 725/136 |
| 2008/0098212 A1* | 4/2008 | Helms et al. | 713/155 |
| 2008/0109855 A1* | 5/2008 | Tsutsui et al. | 725/68 |
| 2008/0172628 A1* | 7/2008 | Mehrotra et al. | 715/771 |
| 2010/0091191 A1* | 4/2010 | Bae et al. | 348/564 |

FOREIGN PATENT DOCUMENTS

| | | |
|---|---|---|
| JP | 2005-73239 | 3/2005 |
| JP | 2005-79978 | 3/2005 |
| JP | 2005-236741 | 9/2005 |
| JP | 2006-510241 | 3/2006 |

\* cited by examiner

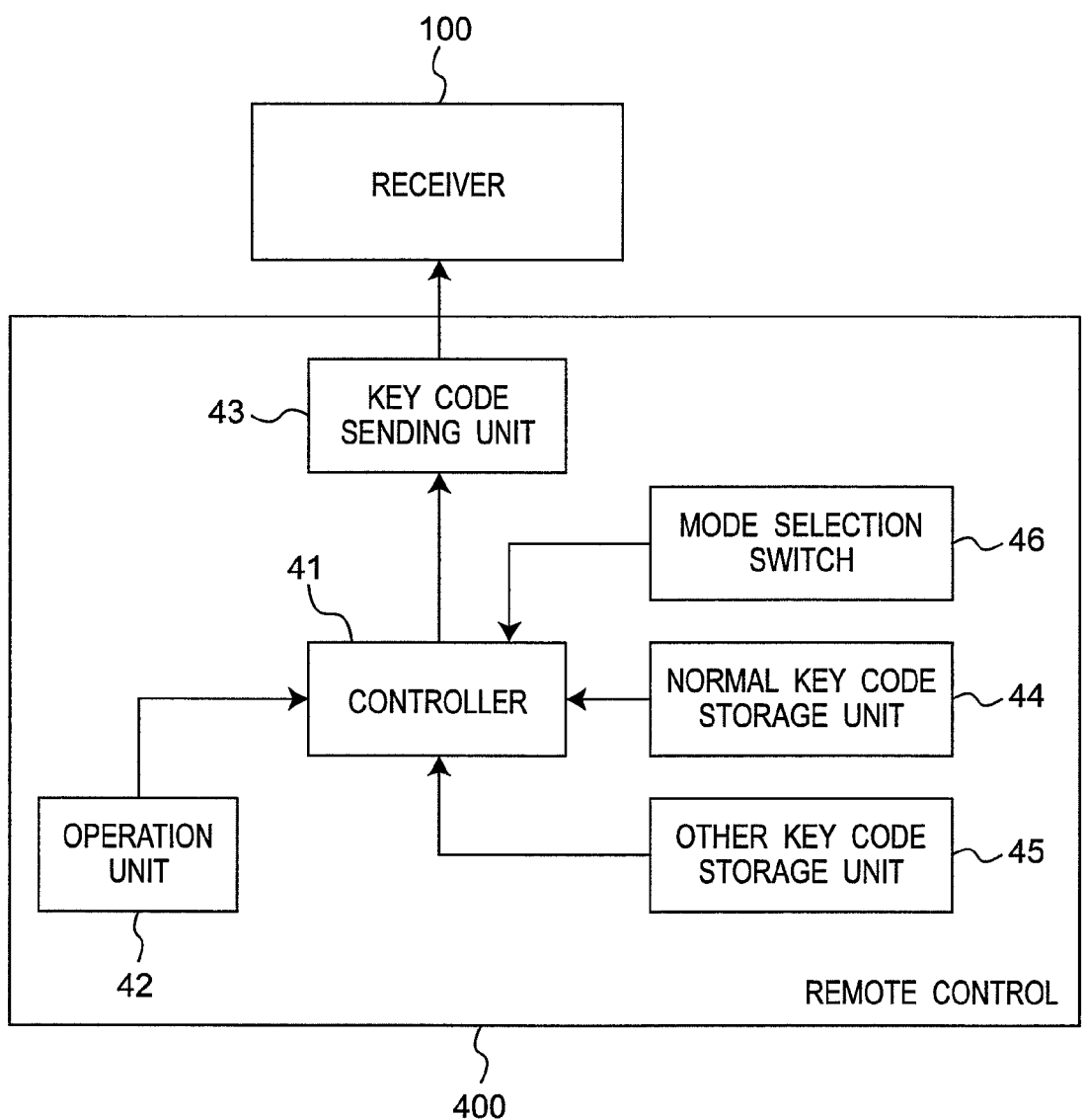

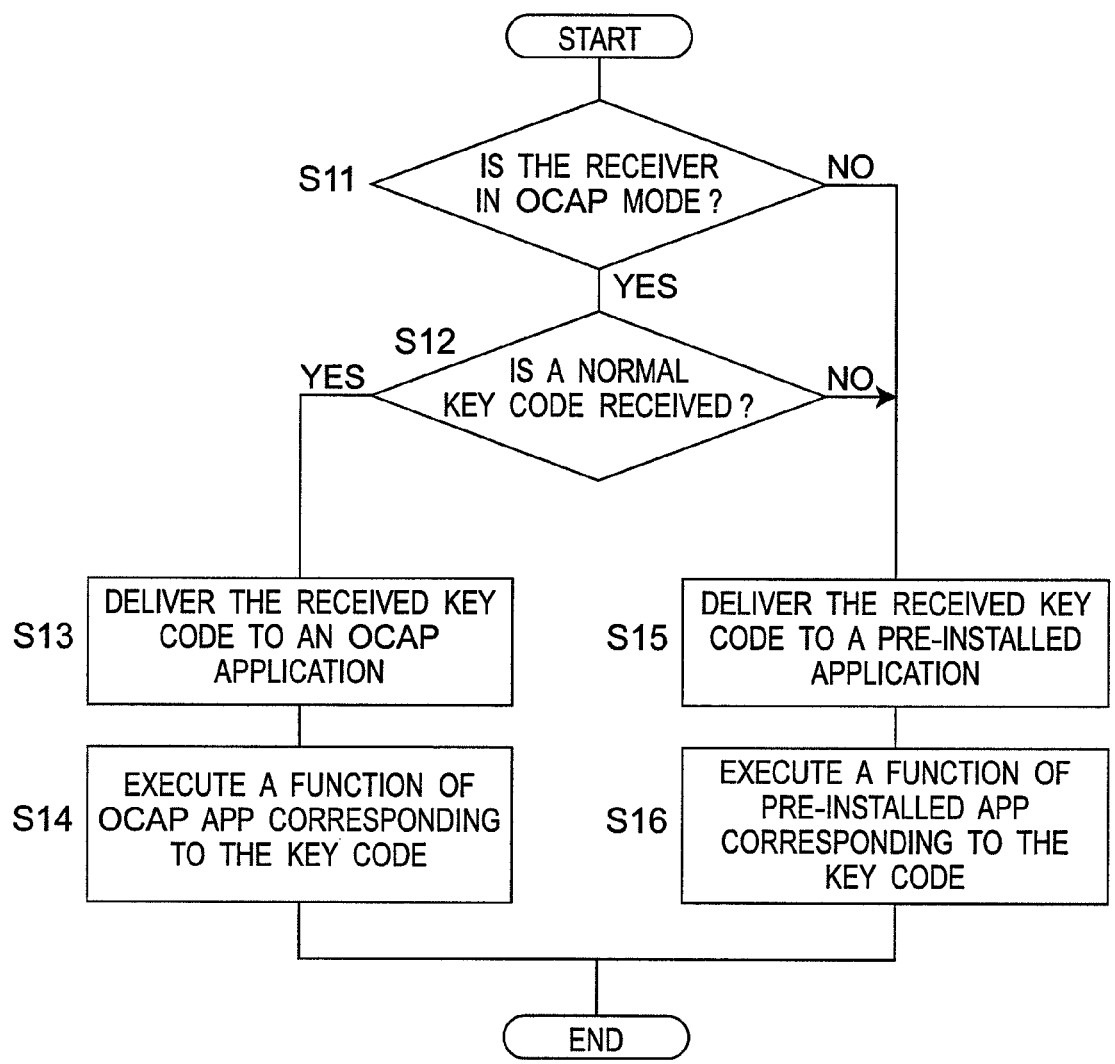

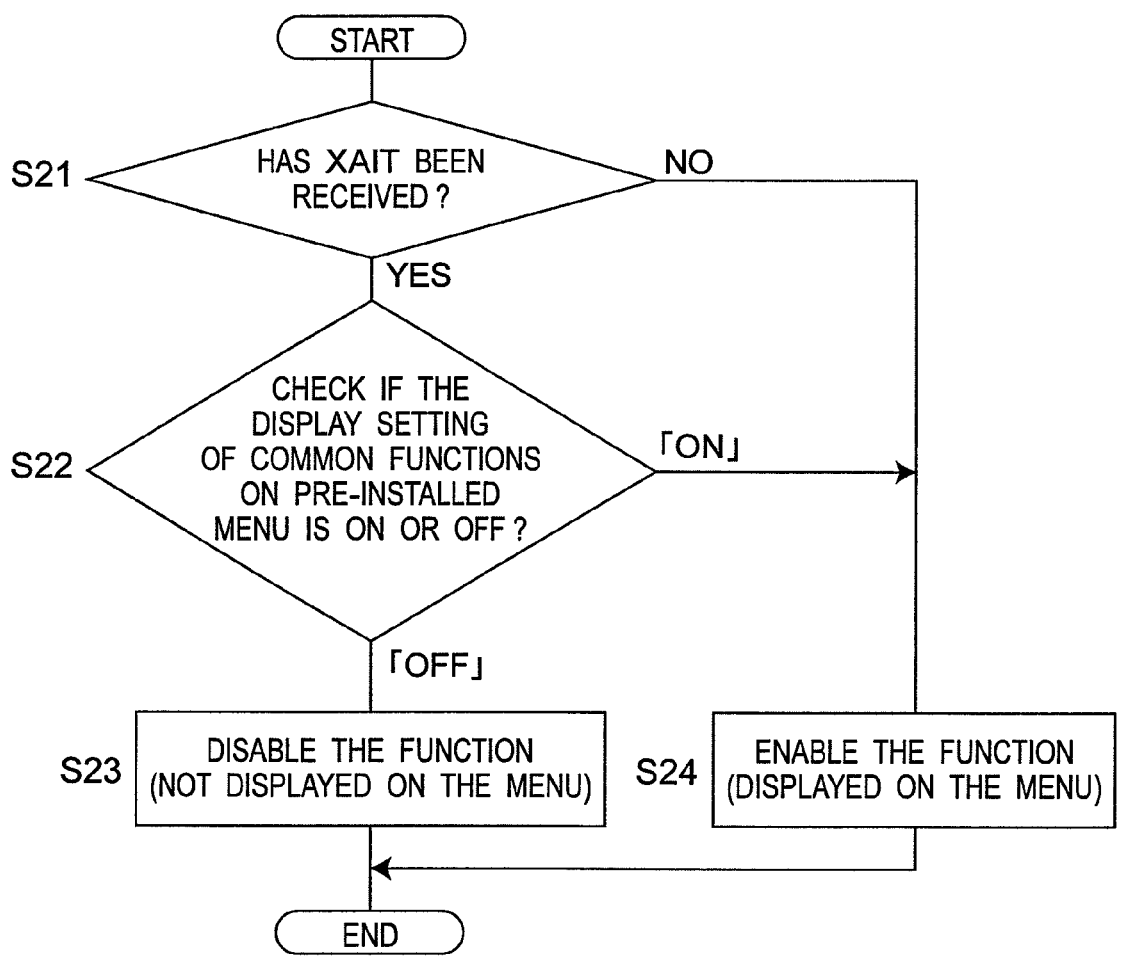

US 8,291,458 B2

DIGITAL BROADCASTING RECEIVER AND DIGITAL BROADCASTING RECEIVING SYSTEM

BACKGROUND ART

1. Field of the Invention

The present invention relates to a receiver for digital broadcast such as cable broadcast, and more particularly, to a receiver that implements various functions based on a pre-installed application and a downloaded application.

2. Related Art

In recent years, digitization has proceeded also in cable broadcast which provides various services. For a receiver for such cable broadcast, various techniques have been developed (see, for example, JP 2006-511106 A (WO 2004/051401)). OCAP (Open Cable Application Platform) has been proposed as a next-generation North American cable broadcast standard.

According to the OCAP, a receiver such as an STB (set-top box) can download various applications (Java applications) such as an electronic program guide (EPG) and an application for viewing VOD (Video on Demand) from a broadcast station and executes the downloaded applications based on an API (Application Program Interface) defined in the OCAP standard, achieving predetermined functions. Namely, the receiver only operates based on the predetermined API and does not recognize specific functions that are implemented by the downloaded applications.

Such a receiver checks, when the power is turned on, whether downloaded applications, and so on, which are periodically transmitted from a broadcast station, have been delivered. If a downloaded application has been delivered, the receiver executes the downloaded application.

The receiver holds an application (hereinafter, referred to as a "pre-installed application") that is originally installed thereon, in addition to a downloaded application transmitted from the broadcast station. When the receiver does not have any downloaded applications, the receiver performs a function according to the pre-installed application.

A downloaded application and the pre-installed application may provide the same function. Such case causes confusion for a user operation, or an operational malfunction since the downloaded application and the pre-installed application may affect each other in resource control. This is not desirable. In such a case, the receiver needs to make the following various adjustments of between control by the pre-installed application and control by the downloaded application:

Control of obtaining of a remote control key;
Display control of a common function between menus;
Exclusive control between resources;
Control of activation of an application.

Further, in the receiver, when data communication is performed by both the downloaded application and a cable card, a plurality of IP addresses and a plurality of MAC addresses need to be processed and thus there is a problem that the process cannot be done with only one ether chip.

SUMMARY OF THE INVENTION

The present invention is made to solve the above-described problems and a first object of the present invention is to provide a cable broadcast receiver that makes an adjustment between control by a pre-installed application and control by a downloaded application to prevent user's confusion.

A second object of the present invention is to provide a receiver that enables IP communication using a plurality of MAC addresses with only one ether chip.

In a first aspect of the invention, a digital broadcast receiver that implements functions by a downloaded application obtained through a network and a pre-installed application is provided. The receiver includes a key receiver that receives a key code transmitted from a remote control, an operation mode manager that switches an operation mode to a first mode in which a function is implemented by the downloaded application or a second mode in which a function is implemented by the pre-installed application, and a key delivery module that delivers the key code received from the remote control to the downloaded application or the pre-installed application. The receiver is operating in the first mode, if the key code received from the remote control is a key code for the first mode, the key delivery module delivers the received key code to the downloaded application and if the key code received from the remote control is a key code for the second mode, the key delivery module delivers the received key code to the pre-installed application When the receiver is operating in the second mode, the key delivery module delivers the received key code to the pre-installed application.

In a second aspect of the invention, a digital broadcast receiving system is provided. The system includes the receiver described above, and a remote control having a selection switch that switches between a mode in which a key code for the first mode is sent and a mode in which a key code for the second mode is sent, and transmitting, to the receiver, a key code which is provided for a mode corresponding to a setting of the selection switch and which corresponds to a user operation.

In a third aspect of the invention, a digital broadcast receiver that implements functions by a downloaded application obtained through a network and a pre-installed application is provided. The receiver includes a determining unit that determines whether management information on the downloaded application has been received, and a menu manager that controls display of a pre-installed menu which is executed by the pre-installed application. The menu manager includes a section for making a display setting to indicate whether each of predetermined functions of a pre-installed menu should be displayed on the pre-installed menu, the pre-installed menu being provided by the pre-installed application, and a section for controlling the display of the pre-installed menu such that when the management information has been received, it is determined whether each of the predetermined functions is to be displayed on the pre-installed menu according to the display setting, and when the management information has not been received, regardless of the display setting, all of the predetermined functions are displayed on the pre-installed menu.

In a fourth aspect of the invention, a digital broadcast receiver is provided. The receiver includes a plurality of input channels; a unit for selecting one of the plurality of input channels; a predetermined processing unit that receives information from the selected input channel; a unit that receives a command for switching from the selected input channel to another input channel; an input switching unit that switches an input channel when the switching command is received; a key delivery unit that delivers a key code to an application, when the key code is received; an application manager that manages an operation of a downloaded application obtained through a network; and a resource controller that sends a resource control request to a predetermined resource, when the resource control request from the application is received. The application manager allows a running application which relates to the selected input channel to be executed in a background, when the switching command is received. The key delivery module prevents transmit the key code to the application, when receiving a key code for the application being executed in a background. The resource controller discards a resource control request, when the resource control request is received from the application being operated in a background.

In a fifth aspect of the invention, provided is a digital broadcast receiver having a first activation mode in which a pre-installed application is activated and a second activation mode in which a downloaded application obtained through a network is activated. The receiver includes a data storage unit that stores activation information on the downloaded application; and a controller for controlling activation of the receiver. The controller activates the receiver in the second activation mode according to activation information when the activation information is stored in the data storage unit upon the activation. Simultaneously, the controller attempts to obtain activation information through the network, and when the activation information is not obtained within a predetermined period of time, ends the second activation mode and activates the receiver in the first activation mode.

In a sixth aspect of the invention, a digital broadcast receiver connected to a network is provided. The receiver includes a packet communication unit that transmits and receives packets to and from the network; a communication controller that is set to be capable of obtaining all packets on the network and controls the packet communication unit; a first module associated with a first address which is provided to the receiver; a second module associated with a second address which is provided to the receiver; and a filter that receives packets from the communication controller, analyzes destination addresses in the received packets. The filter further filters the received packets according to the destination addresses, transmits the received packet having a destination address equal to the first address to the first module, and transmits the received packet having a destination address equal to the second address to the second module.

EFFECT OF THE INVENTION

According to the present invention, in a cable broadcast receiver, an adjustment is made between control by a pre-installed application and control by a downloaded application to prevent user's confusion and suppress occurrence of a malfunction of resource control.

In addition, according to the present invention, IP communication using a plurality of MAC addresses is enabled with one ether chip and thus the configuration of a receiver can be simplified.

BRIEF DESCRIPTION OF DRAWINGS

FIG. 3 is a diagram showing a configuration of a remote control.

FIG. 4 is a flowchart showing a process of the receiver upon receiving a key code from the remote control.

FIG. 7 is a flowchart showing a process of a menu manager, related to display control of common functions on the pre-installed menu.

DETAILED DESCRIPTION OF THE INVENTION

A preferred embodiment of the present invention is described below with reference to the accompanying drawings.

1. Hardware Configuration of Receiver

Figure 1:
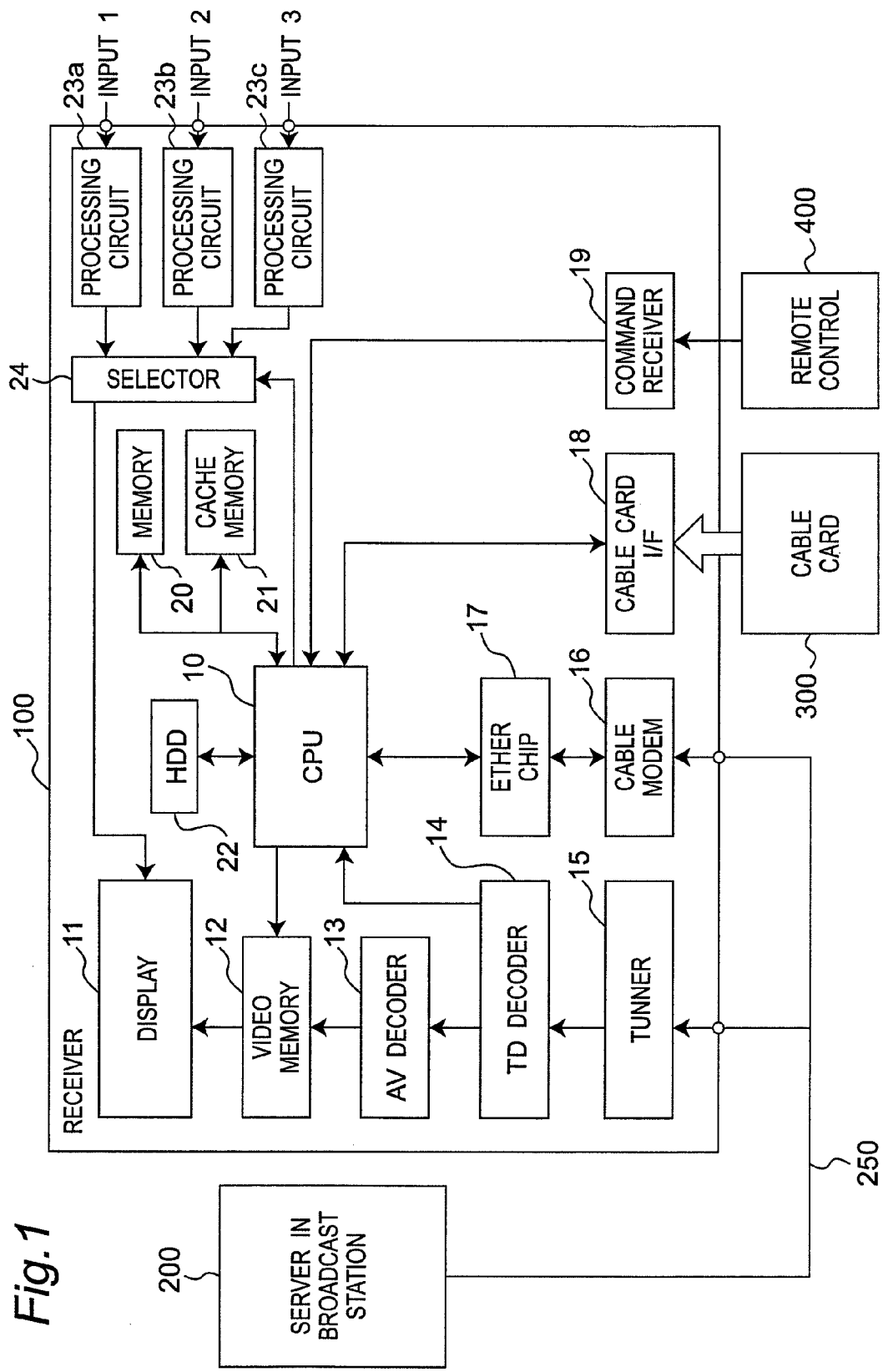
FIG. 1 is a diagram showing a hardware configuration of a receiver that receives a cable broadcast according to an embodiment of the present invention.

FIG. 1 is a diagram showing a hardware configuration of a receiver that receives a cable broadcast according to an embodiment of the present invention. A receiver 100 is connected through a cable 250 to a server 200 which is set up in a cable broadcast station and which provides a cable broadcast. A cable card 300 for receiving a cable broadcast is inserted into the receiver 100. The receiver 100 receives user operation information (key code) through a remote control 400 and performs a process according to the operation. The receiver 100 of the present embodiment can receive a cable broadcast complying with an OCAP (Open Cable Application Platform) standard. Note that in FIG. 1 a configuration for processing an audio signal is omitted for simplification of description.

The receiver 100 has a hardware configuration as shown in FIG. 1. A display 11 displays a video reproduced by a pre-installed application or an OCAP application or a received video. A video memory 12 stores video data to be displayed on the display 11. An AV decoder 13 decodes audio/video data sent in an MPEG format or the like from the cable station. A TD decoder 14 filters a transport stream in which audio/video/data are multiplexed. A tuner 15 receives a signal sent from the cable broadcast station through the cable 250.

A CPU 10 is a controller for controlling an operation of the receiver 100. The CPU 10 is connected to a hard disk drive (HDD) 22 as data storage means, a volatile memory 20, and a cache memory 21 as nonvolatile storage means.

The receiver 100 further includes a cable card interface 18 for exchanging data with the cable card 300, and a command receiver 19 for receiving a signal from the remote control 400. The cable card 300 is a card to enable reception of a broadcast from a specific cable broadcast station.

The receiver 100 further includes a cable modem 16 for connecting to the Internet through the cable 250, and an ether chip 17 for transmitting and receiving ether packets.

The receiver 100 is provided with input channels (input 1, input 2, and input 3) for a plurality of pieces of video and audio information other than information from a cable broadcast. Each input is connected to each of processing circuits 23a to 23c for processing a video and audio signal. A selector 24 selects one of outputs from the processing circuits 23a to 23c and the selected output is outputted to the display 11. Note that in the receiver 100 of the present embodiment, either one of a cable broadcast and the inputs 1 to 3 is selected by the CPU 10 based on a user operation and outputted to the display 11.

2. Functional Configuration of Receiver

Figure 2:
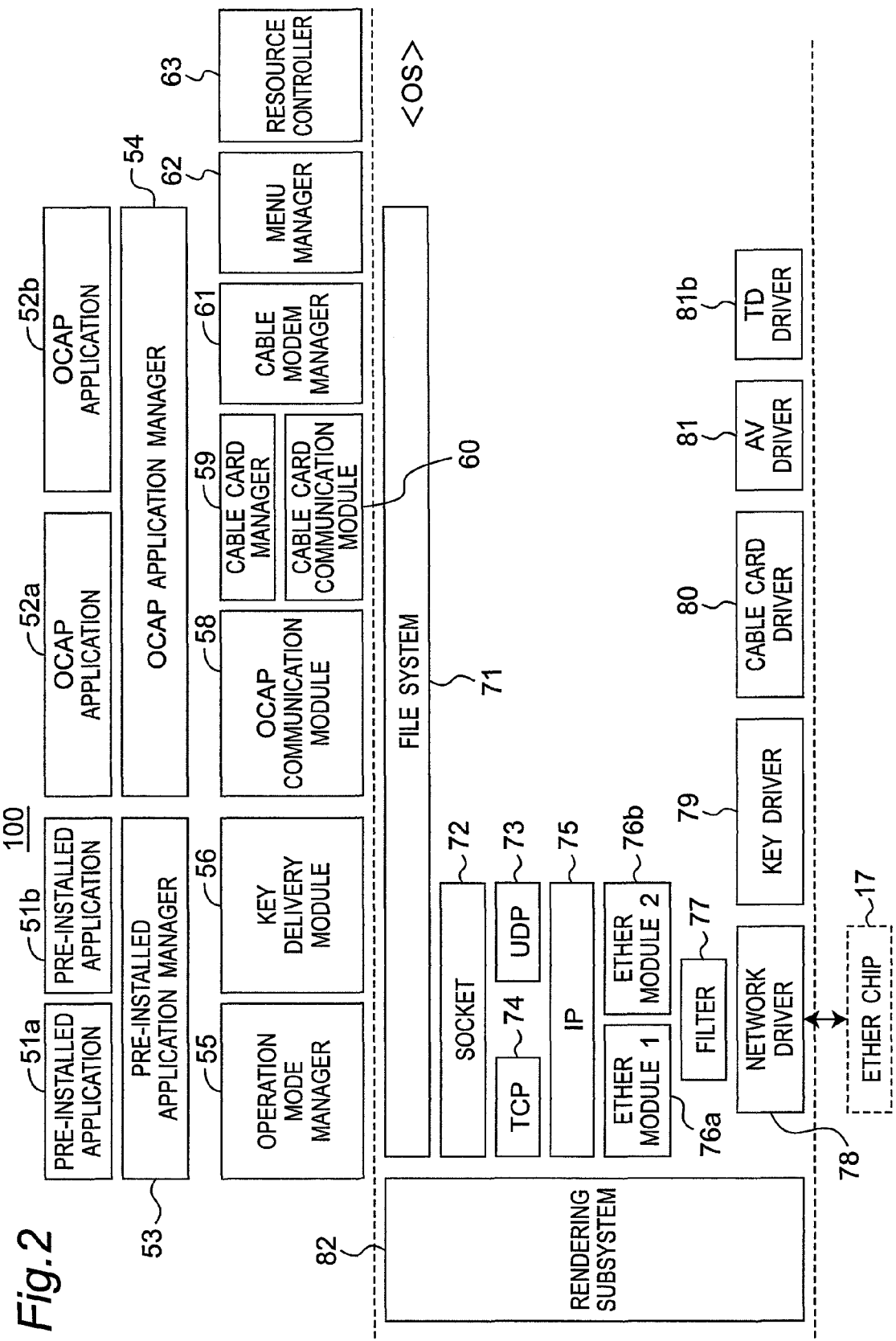
FIG. 2 is a diagram showing a functional configuration of the receiver.

FIG. 2 shows a functional configuration of the receiver 100. The functional configuration shown in FIG. 2 is implemented by the CPU 10 executing a predetermined program. Note that for convenience of description FIG. 2 shows only primary functions. Needless to say, functions of the receiver 100 described later (though not shown in FIG. 2) can be implemented by the CPU 10 executing a predetermined program.

As shown in FIG. 2, the receiver 100 includes applications (hereinafter, referred to as "pre-installed applications") 51a and 51b which are installed thereon upon shipment, and applications (hereinafter, referred to as "OCAP applications") 52a and 52b which are obtained by download from the cable broadcast station. A pre-installed application manager 53 performs screen exclusive control and key delivery control of the pre-installed applications. An OCAP application manager 54 is middleware that executes Java bytecode and the OCAP application and also performs screen exclusive control and key delivery control of the OCAP application.

An operation mode manager 55 is a module for managing an operation mode of the receiver 100. The operation mode includes an operation mode (hereinafter, referred to as an "OCAP mode") in which an OCAP application is executed, and an operation mode (hereinafter, referred to as an "IDTV mode (or non-OCAP mode)") in which a pre-installed application is executed.

A key delivery module 56 is a module for delivering a key code from the remote control 400 which is received by a key driver 79, to the pre-installed application manager 53 or the OCAP application manager 54.

A cable card manager 59 is a module that receives, manages, and executes a request from the cable card 300. A cable modem manager 61 is a module for controlling the cable modem 16, such as scan of DSG channel/acquirement of DSG tunnel.

A menu manager 62 is a module for managing a setting menu presented by an OCAP application or a pre-installed application.

A resource controller 63 is a module for controlling a control request from an application to a resource including the display 11 or a speaker, such as a video output or an audio output.

A file system 71 is a subsystem on OS (Operating System) for managing a file system API (Open/close/write/ioctl, etc.) from an application to the OS. A socket (SocketAPI) 72 is a subsystem for managing a network API from an application to the OS.

TCP 74 is a module for controlling TCP communication requested by the socket 72. UDP 73 is a module for controlling UDP communication requested by the socket 72. IP 75 is a module for controlling transmission and reception of IP packets and packet routing. Ether modules 76a and 76b are modules for controlling transmission and reception of ether packets. A filter 77 is a driver for distributing ether packets to the ether module 76a or 76b.

A network driver 78 is a device driver for controlling the ether chip 17. The key driver 79 is a device driver that receives a key code transmitted from the remote control 400. A cable card driver 80 is a device driver for controlling transmission and reception of data from the cable card 300. An AV driver 81 is a device driver for decoding an AV stream in the AV decoder 13.

A TD driver 81b is a device driver for filtering section data in the TD decoder 14. A rendering subsystem 82 is a subsystem for allowing a video rendered by an OCAP application or a pre-installed application to be displayed on the display 11.

3. Functions of Receiver

Various functions of the receiver 100 having the above-described configuration in the present embodiment are described below.

3.1 Delivery Control of Remote Control Key

According to the OCAP standard, remote control keys that can be used for OCAP applications are defined. Similarly, remote control keys that can be used for pre-installed applications are also defined. The remote control 400 has a menu key for activating a menu (hereinafter, referred to as a "pre-installed menu") which is executed by a pre-installed application of the receiver 100. In such circumstances, a remote control key for providing a predetermined function of an OCAP application may be the same as a remote control key for activating a pre-installed menu of the receiver 100. In such a case, there is a problem that when the receiver 100 is operated in an OCAP mode, a pre-installed menu of the receiver 100 cannot be displayed using the remote control 400.

To solve the above-described problem, in the present embodiment, a selection switch is provided to the remote control 400 for allowing a key code to be sent, to be switched according to an operation mode. Furthermore, the receiver 100 is configured to change a delivery destination of a received key code according to an operation mode. A specific description is provided below.

FIG. 3 shows a configuration of the remote control 400. The remote control 400 includes a controller 41 for controlling an operation of the remote control 400, an operation unit 42 including various operation keys used for a user operation, and a key code sending unit 43 for transmitting a key code. The operation unit 42 includes a menu key for activating a menu. The remote control 400 has a mode selection switch 46, enabling transmission of a key code according to an operation mode. The remote control 400 includes a normal key code storage unit 44 for storing key codes (hereinafter, referred to as "normal key codes") for an OCAP mode, and other key code storage unit 45 for storing key codes (hereinafter, referred to as "other-key codes") for an IDTV mode (non-OCAP mode). The other-key code may be generated by adding predetermined byte data (e.g., "OA") to the front of a normal key code having the same function as the other key code.

When the mode selection switch 46 is on, the remote control 400 transmits a normal key code for the OCAP mode. Specifically, the remote control 400 transmits a key code for the OCAP mode that corresponds to a key operated by the user, from the key code sending unit 43. On the other hand, when the mode selection switch 46 is off, the remote control 400 transmits an other-key code for the IDTV mode. Specifically, the remote control 400 transmits the other-key code corresponding to a key operated by the user from the key code sending unit 43.

Next, with reference to FIG. 4, an operation of the receiver 100 upon receiving a key code from the remote control 400 is described.

When the remote control 400 is operated by the user, a key code is transmitted to the receiver 100 from the remote control 400. When the receiver 100 receives the key code from the remote control 400, the receiver 100 transmits the key code received by the key driver 79 to the key delivery module 56.

The key delivery module 56 determines whether the operation mode of the receiver 100 is an OCAP mode (S11). If the operation mode is an OCAP mode, the key delivery module

56 further determines whether the received key code is a "normal key code" which is a key code for the OCAP (S12).

If the received key code is a normal key code, the received key code is delivered to an OCAP application (S13). The OCAP application provides a function based on the received key code (S14).

If the received key code is not a normal key code, the received key code is delivered to a pre-installed application (S15). The pre-installed application provides a function based on the received key code (S16).

On the other hand, in step S11, if the operation mode of the receiver 100 is not an OCAP mode, i.e., if the operation mode is an IDTV mode, the key delivery module 56 delivers the received key code to a pre-installed application (S15). The pre-installed application performs a function based on the received key code (S16).

According to the above-described process, for example, when the menu key of the remote control 400 is pressed with the mode selection switch 46 set on, a key code (normal key code) for the OCAP mode is sent from the remote control 400 and thus a menu provided by an OCAP application is displayed. On the other hand, when the menu key is pressed with the mode selection switch 46 set off, a key code (other-key code) for the IDTV mode is sent from the remote control 400 and thus a menu provided by a pre-installed application, i.e., a pre-installed menu, is displayed. Namely, by leaving the mode selection switch 46 of the remote control 400 to be off, even when the receiver 100 is operating in an OCAP mode, a pre-installed menu of the receiver 100 can be displayed by a remote control operation.

3.2 Display Control of Common Function on Pre-Installed Menu

While the receiver 100 operates in an IDTV mode, a caption setting, a personal identification number (PIN) setting, and so on, are made on the pre-installed menu of the receiver 100.

While the receiver 100 operates in an OCAP mode, various functions are implemented by OCAP applications created by multiple system operators (MSO). What functions are to be included in an OCAP application is determined by the multiple system operator, and therefore OCAP applications do not always support the above-described caption setting and PIN setting functions.

The caption setting and the PIN setting are important functions and thus these functions need to be always implemented by the receiver 100. Therefore, in the receiver 100, even when an OCAP application does not support such functions, display of the pre-installed menu needs to be controlled so that the caption setting and the PIN setting can be made while the receiver 100 is operating in an OCAP mode.

Figure 5A:
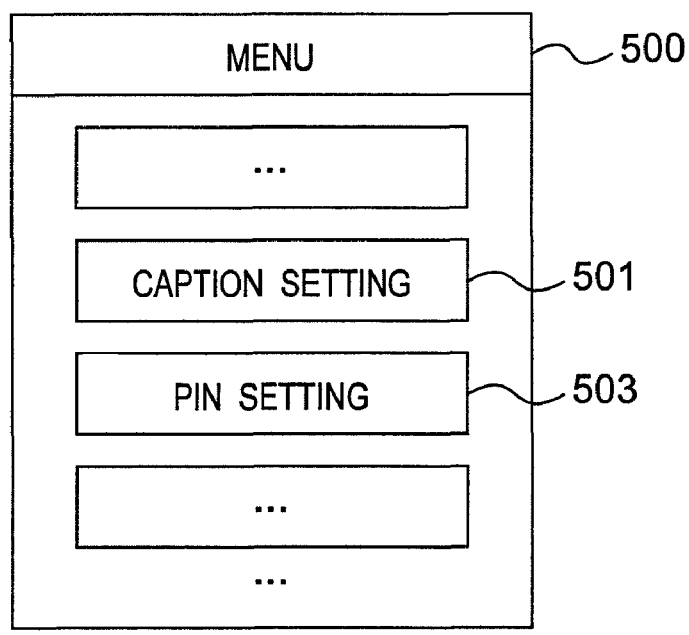
FIG. 5A is a diagram showing an example of a pre-installed menu.
Figure 5B:
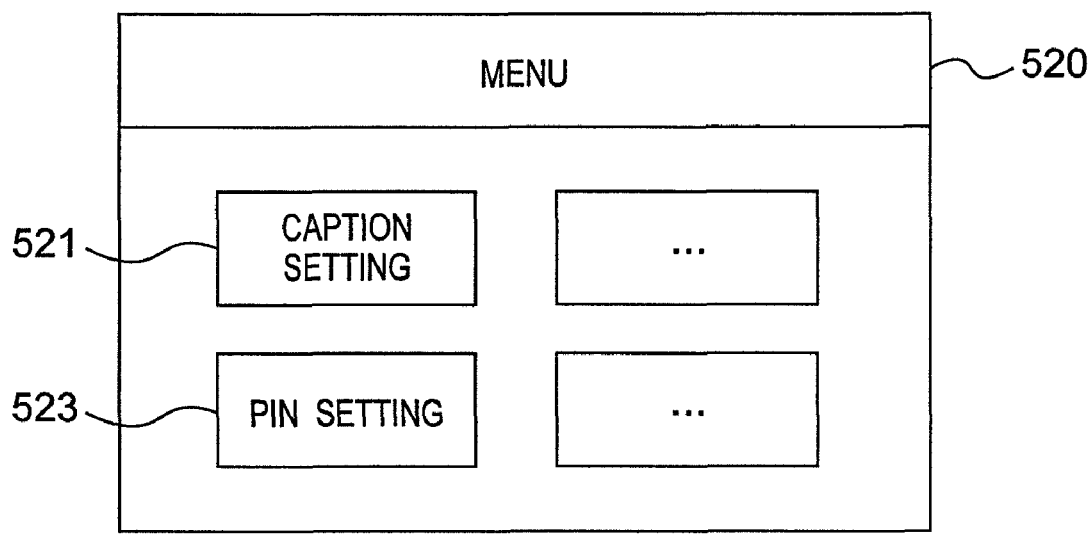
FIG. 5B is a diagram showing an example of a menu provided by an OCAP application.

FIG. 5A shows exemplary display of the pre-installed menu and FIG. 5B shows exemplary display of a menu provided by an OCAP application. A pre-installed menu 500 includes an icon 501 which is to be selected by the user for making a caption setting, and an icon 503 which is to be selected for making a PIN setting. Similarly, a menu 520 provided by an OCAP application includes an icon 521 which is to be selected for making a caption setting, and an icon 523 which is to be selected for making a PIN setting. As shown in FIGS. 5A and 5B, important functions such as a caption setting and a PIN setting may be provided by both the menu 520 provided by an OCAP application and the menu 500 provided by a pre-installed application. Hence, when the same functions are thus present in the two menus, the user may be confused and have trouble about deciding which menu to use.

In view of this, the receiver 100 of the present embodiment controls display of the pre-installed menu such that functions that overlap between an OCAP application and a pre-installed application are not basically displayed doubly.

Specifically, predetermined functions (hereinafter, referred to as "common functions") that can be displayed in common on menus provided by an OCAP application and the pre-installed menu are not basically displayed on the pre-installed menu when an OCAP application is received. However, setting as to whether the common functions are to be displayed on the pre-installed menu when an OCAP application is received can be set by the user. This setting is hereinafter referred to as a "display setting of common functions". Specifically, depending on user's request, even when an OCAP application is received, the common function is allowed to be displayed on the pre-installed menu. This is because if the user does not get confused upon operation, there is no problem. On the other hand, when an OCAP application is not received, the common functions are always displayed on the pre-installed menu.

Figure 6A:
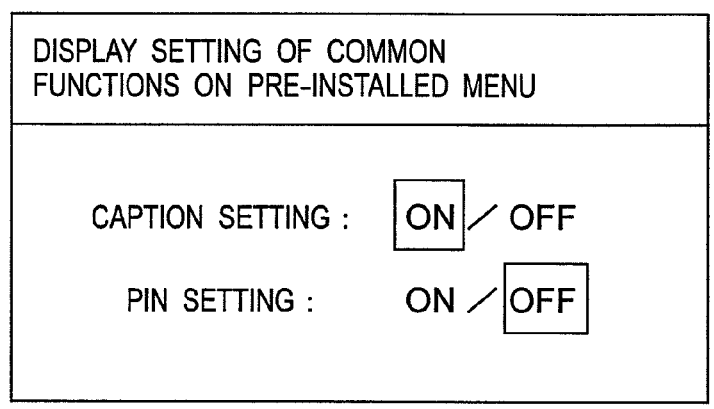
FIG. 6A is a diagram showing an exemplary screen for settings for display of common functions on the pre-installed menu.

The display setting of common functions on the pre-installed menu is described. FIG. 6A shows an exemplary screen image for display setting of common functions on the pre-installed menu. In the drawing, a caption setting is "ON" and a PIN setting is "OFF". These settings specify that when the receiver 100 has received an OCAP application, an icon for caption setting is displayed but an icon for PIN setting is not displayed on the pre-installed menu. Note that default values for the display setting of common functions are "OFF". Namely, if the receiver 100 has received an OCAP application, the common functions are not basically displayed on the pre-installed menu, and only when the user requests, the requested function is displayed.

In the present embodiment, a determination as to whether an OCAP application has been received is made based on whether XAIT (Extended Application Information Table) has been received. XAIT is management information on a downloaded application transmitted from the cable broadcast station, and contains a storage location of the application and information on an application to be started. The receiver 100 periodically receives XAIT from the server 200 of the cable broadcast station.

The receiver 100 performs control as to whether a common function is displayed or not on the pre-installed menu, according to reception state of XAIT and the display setting of common functions on the pre-installed menu. Such a control is described in Table 1. As shown in Table 1, when XAIT has been received, display is made according to the display setting of common functions. When XAIT has not been received, regardless of contents of the display setting of common functions, the common functions are displayed on the pre-installed menu.

TABLE 1

| Reception of XAIT | Display setting of common functions on pre-installed menu | |
|---|---|---|
| | ON | OFF |
| Received | Function → On (Displayed) | Function → Off (Not displayed) |
| Not received | Function → On (Displayed) | Function → On (Displayed) |

FIG. 7 shows a flowchart of the menu manager 62 of the receiver 100, related to the above-described control. The menu manager 62 determines whether XAIT has been received or not (S21). The fact that XAIT has been received means that the receiver 100 can operate in an OCAP mode. In this case, there exist two menus provided respectively by an OCAP application and a pre-installed application, the aforementioned problem of duplicate display of common functions can occur.

If XAIT has been received, the menu manager 62 checks a display setting of common functions on the pre-installed menu (S22). If the display setting is "OFF", i.e., if a setting is made such that the function is not displayed (performed) on the pre-installed menu, display of the pre-installed menu is controlled such that the function is not displayed on the pre-installed menu (S23). If the display setting is "ON", i.e., if a setting is made such that the function is displayed (performed) on the pre-installed menu, display of the pre-installed menu is controlled such that the function is displayed on the pre-installed menu (S24).

The fact that XAIT has not been received means that the receiver 100 operates only in an IDTV mode. Thus, this case requires a caption setting and a PIN setting which can be made on the pre-installed menu. Hence, if XAIT has not been received, display of the pre-installed menu is controlled such that each function is displayed on the pre-installed menu (S24). The above-described process is performed on each common function.

Figure 6B:
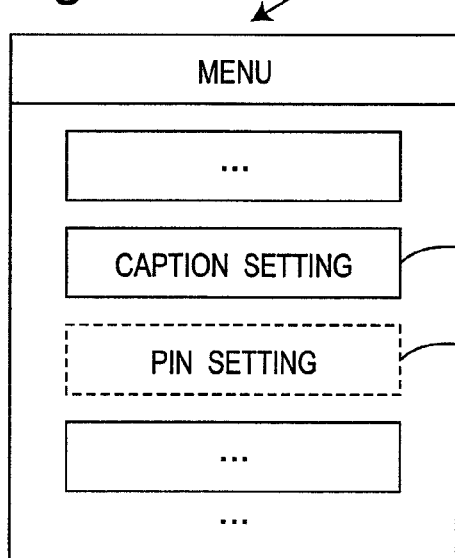
FIG. 6B is a diagram showing exemplary display of the pre-installed menu when XAIT is received.
Figure 6C:
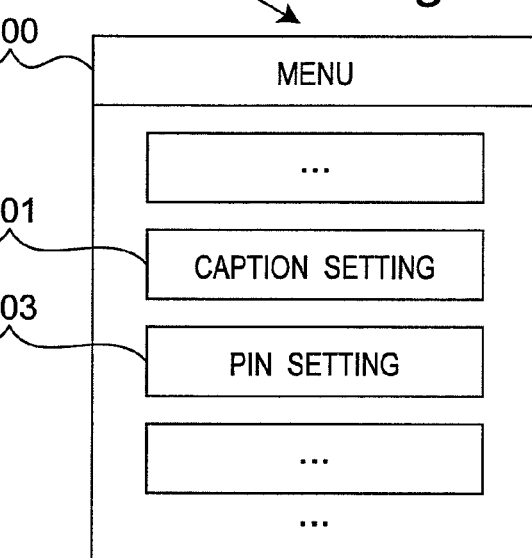
FIG. 6C is a diagram showing exemplary display of the pre-installed menu when XAIT is not received.

For example, when the display setting for a caption setting and a PIN setting is made as shown in FIG. 6A, if XAIT has been received, the pre-installed menu 500 as shown in FIG. 6B is displayed, in which an icon 501 for the caption setting is displayed and an icon 503 for the PIN setting is not displayed. On the other hand, if XAIT has not been received, the pre-installed menu 500 as shown in FIG. 6C is displayed in which an icon 501 for the caption setting and an icon 503 for the PIN setting are displayed.

Control of display of the pre-installed menu in the above-described manner can eliminate duplicate display of functions to be displayed on the pre-installed menu and a menu provided by an OCAP application, and accordingly can prevent user's confusion and provide user-friendly operation environment.

3.3 Exclusive Control of Resource upon Switching of Input Source

As shown in FIG. 1, the receiver 100 of the present embodiment has a plurality of input channels (input 1, input 2, and input 3) in addition to a cable broadcast, one (input source) of which is to be selected.

When an input is switched from an input source where an OCAP application such as a VOD (Video On Demand) is being executed to another input source, the receiver 100 keeps the OCAP application being executed in a background without finishing the OCAP application. A process of executing the OCAP application in a background, as described above, is hereinafter referred to as a "pause process". The pause process is controlled by the OCAP application manager 54. The pause process allows the OCAP application to be promptly executed when the input is switched back again to the original input source.

While the OCAP application is in a pause state, if the user operates a remote control key associated with the OCAP application, the OCAP application may react to the key and video or audio may be outputted. Also, due to the original specification of the OCAP application operated in a background, a control request (e.g., request for display of a pop-up window) to a resource such as a video output or an audio output may be issued. In such a case, use of resources such as a screen image and audio is not adjusted and thus there is a possibility that video image, audio output, and so on may be distorted. Further, during the OCAP application operated in a background, when an external input (PC/HDMI, etc.) or a pre-installed application such as Jpeg Viewer is simultaneously operated, use of resources such as a screen and audio which are shared between a plurality of applications is not adjusted, and thus there is a possibility that video image, audio output, and so on may be distorted.

To solve the above-described problems, when an input is switched from an input source to which an OCAP application is being executed to the other input source, the receiver 100 of the present embodiment controls the OCAP application being executed to a pause state. In the pause state, the control is done so that a key code received from outside and a resource control request generated internally is discarded (ignored). This is described in detail with reference to FIG. 8.

Figure 8:
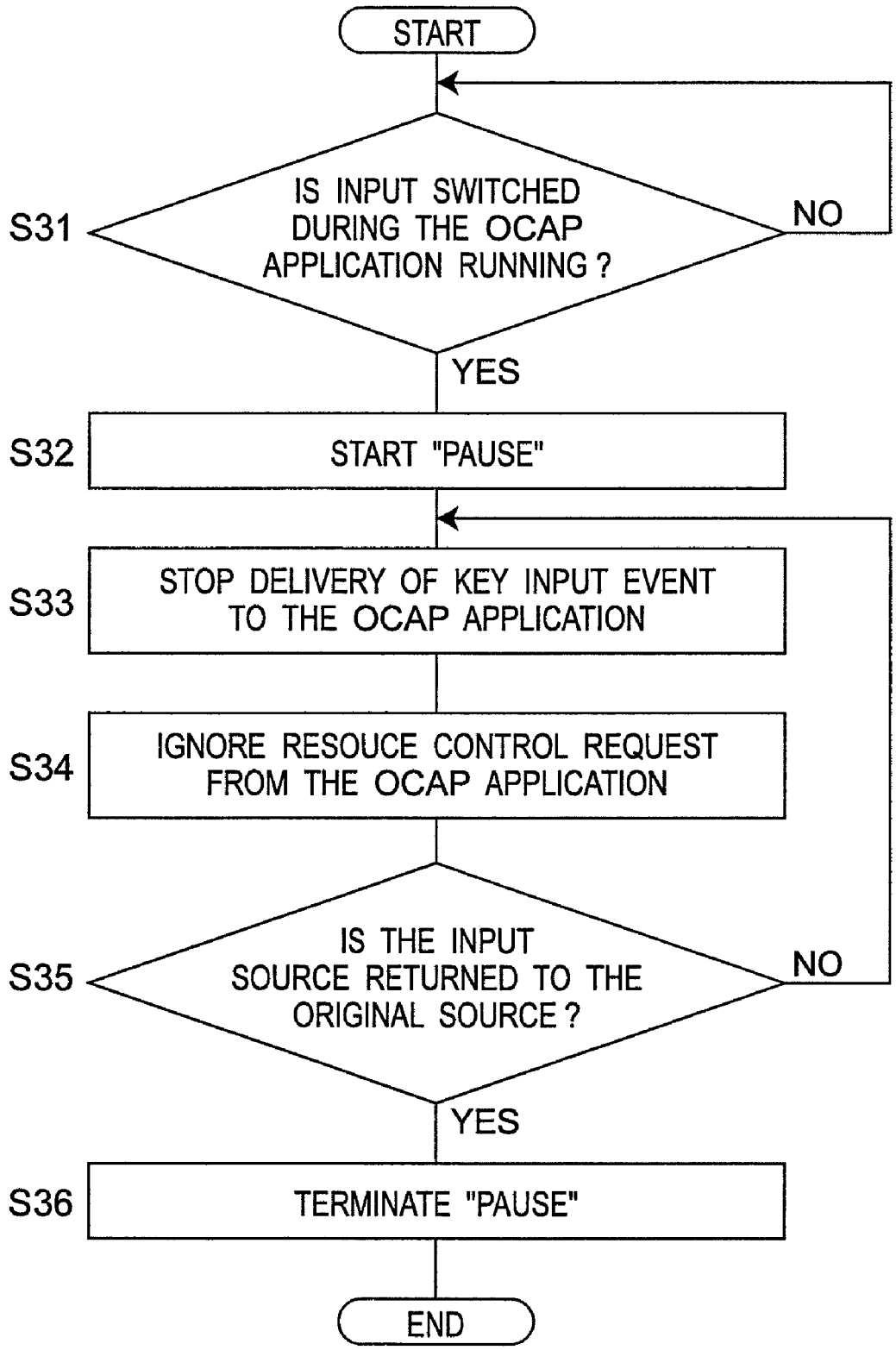
FIG. 8 is a flowchart of exclusive control of resources upon switching of an input.

FIG. 8 is a flowchart of exclusive control of a resource upon switching of an input. When a command to switch an input from an input source to which an OCAP application is being executed to another input source is received, the input is switched (S31). Along with this, the OCAP application is controlled to be in a pause state (S32).

When the OCAP application is in a pause state, even if a key code from the remote control 400 or the like is input to the OCAP application, the OCAP application manager 54 does not deliver the key code to the OCAP application (S33). During the pause state, even if receiving a resource control request from the OCAP application being executed in a background, the resource controller 63 discards (ignores) the control request (S34).

Thereafter, when the input source is switched to the original input source (S35), the pause process ends (S36). Subsequently, the control is done a normal way for delivery of a key code to the OCAP application and control of a resource from the OCAP application.

By the above-described method, for example, even when an input is switched while viewing a VOD (Video On Demand) by an OCAP application, video image, audio output, and so on are not distorted and when the input is switched back again to the view of VOD, the VOD can be promptly displayed.

3.4 High-speed Activation Control upon Power-On

The receiver 100 performs the following process after the main power is turned on and before an EPG (Electronic Program Guide) application which is one of OCAP applications is activated.

(1) The receiver 100 receives a command for a DSG (Docsis Set-top Gateway) mode from the cable card 300 and requests the cable modem 16 to scan DSG channel.

(2) The cable modem 16 completes the scanning and transmits a DCD (Downstream channel Descriptor) to the CPU 10.

(3) The CPU 10 transmits the DCD to the cable card 300, receives a DSG tunnel open request for XAIT from the cable card 300 to send a command to the cable modem 16.

(4) The CPU 10 transmits DSG tunnel packets received from the cable modem 16 to the cable card 300, and receives XAIT data from the cable card 300.

(5) The CPU 10 identifies a monitor application to be activated, from the XAIT, and activates the application.

(6) The monitor application activates an EPG application.

As described above, the receiver 100 needs to obtain XAIT in order to obtain activation information used to activate an EPG. Since the obtaining of XAIT requires various steps, the obtaining of XAIT requires time, and as a result it takes time to activate an EPG.

In view of this, the receiver 100 of the present embodiment stores the received XAIT in the nonvolatile cache memory 21 and performs activation when the main power is turned on, using XAIT stored in the cache memory 21. With this configuration, the XAIT obtaining time is reduced and the time required to activate an EPG is reduced. This process is described below with reference to flowcharts in FIGS. 9 and 10.

When the main power of the receiver 100 is turned on, it is determined whether XAIT is stored in the cache memory 21 (S51). If XAIT is stored in the cache memory 21, an OCAP application described in XAIT is activated (S52). As such, since XAIT can be obtained immediately after the main power is turned on, the time required to activate an EPG can be reduced.

Figure 9:
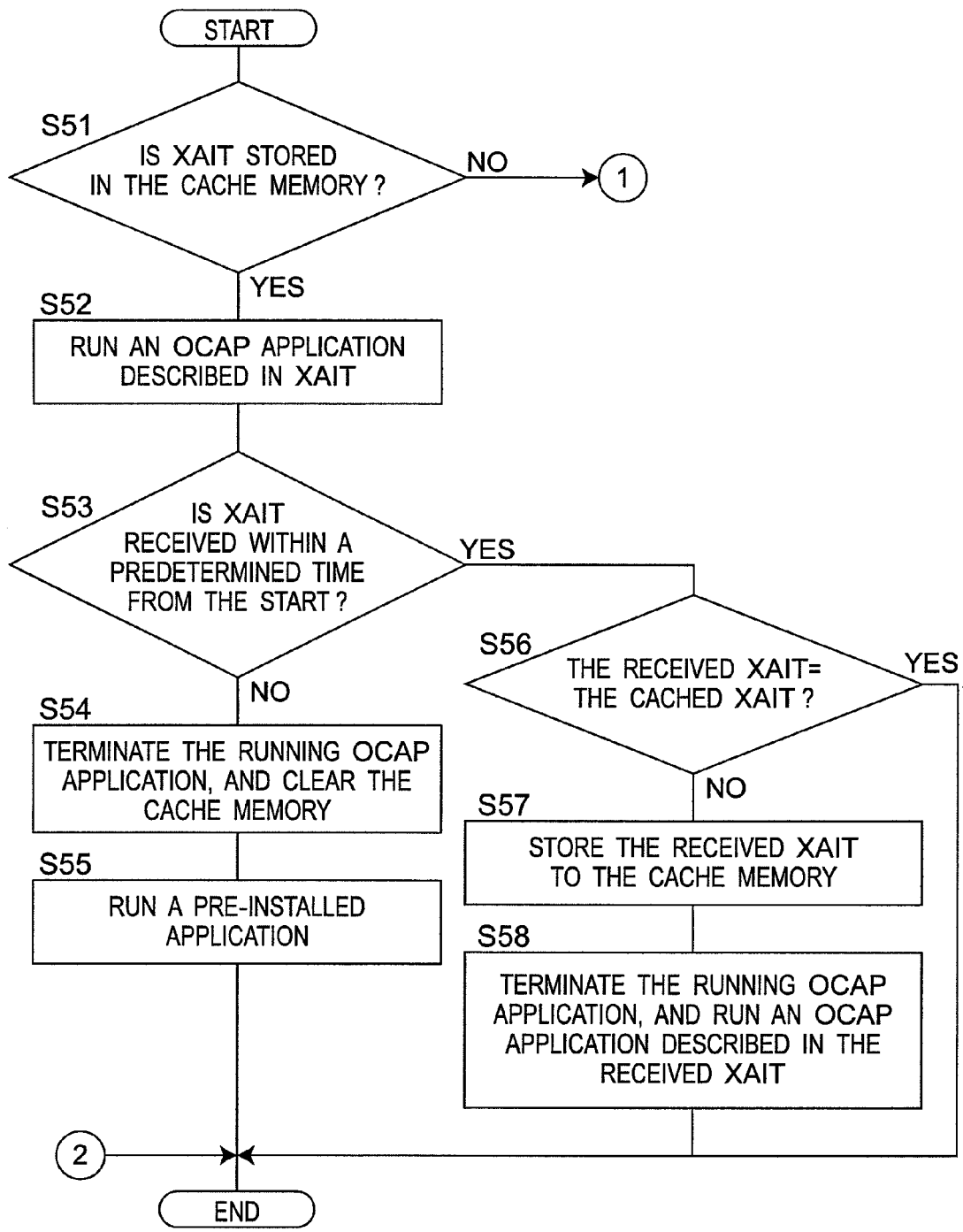
FIG. 9 is a flowchart of a process upon starting the receiver.
Figure 10:
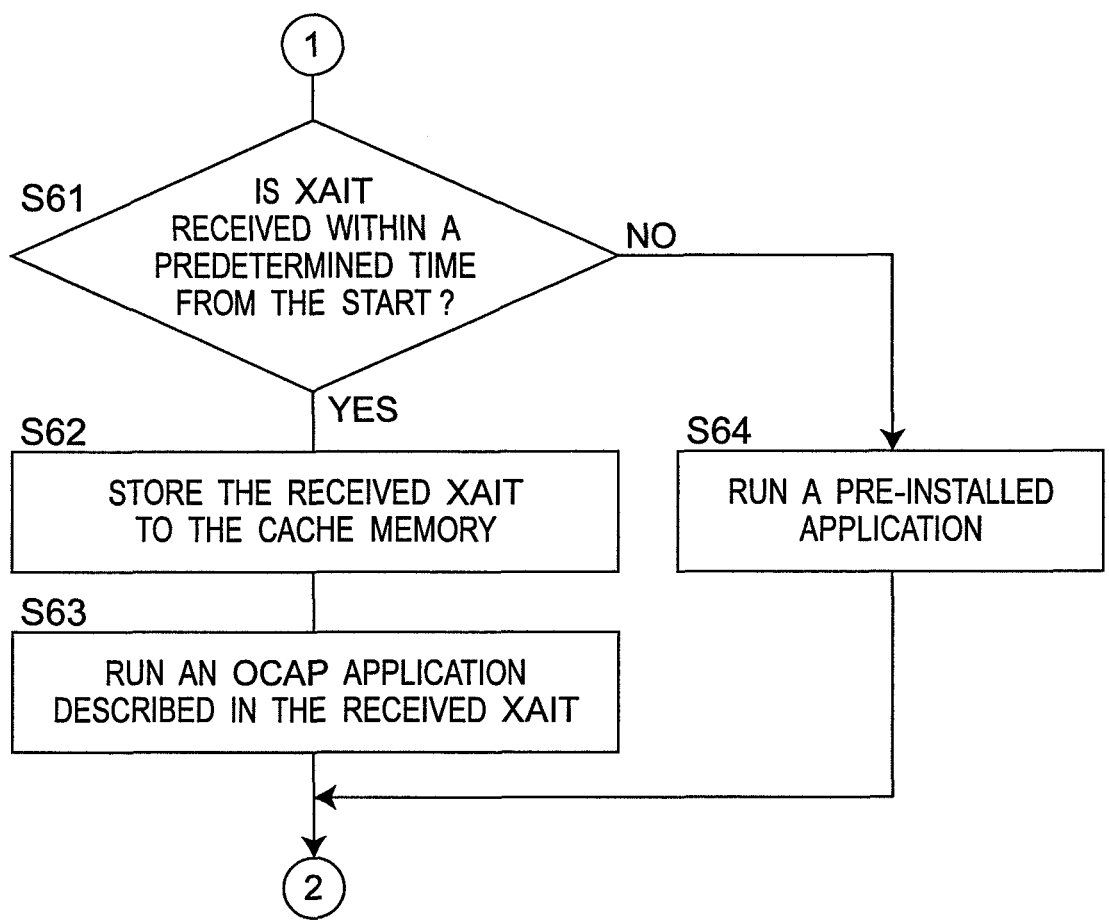
FIG. 10 is a flowchart of a process upon starting the receiver (to be combined with FIG. 9).

Note that, when the main power of the receiver 100 is turned on, the aforementioned steps (1) to (4) are performed in parallel with steps shown in FIGS. 9 and 10, so that a process for receiving XAIT is performed. It is determined whether XAIT has been received within a predetermined period of time (e.g., within 10 seconds) after the main power is turned on (S53).

If XAIT has not been received within a predetermined period of time, the OCAP application being activated is terminated and the cache memory 21 is cleared (S54) and a pre-installed application is activated (S55). This operation is performed because it is determined that a cable broadcast received by the receiver 100 does not support the OCAP.

If XAIT has been received within the predetermined period of time, it is determined whether the received XAIT is equal to the cached XAIT (S56). If the both XAITs are equal to each other, the process ends because XAIT that has been used for the activation is the correct one. If the both XAITs are different from each other, the received XAIT is stored in the cache memory 21 (S57). Thereafter, the OCAP application being activated is terminated and an OCAP application described in the received XAIT is activated (S58). This operation is performed because an OCAP application needs to be activated using the correct XAIT.

On the other hand, in step S51, if XAIT is not stored in the cache memory 21, it is determined whether XAIT has been received within a predetermined period of time after the main power is turned on (S61). If XAIT has been received within the predetermined period of time, the received XAIT is stored in the cache memory 21 (S62) and an OCAP application described in the received XAIT is activated (S63). If XAIT has not been received within the predetermined period of time after the main power is turned on, a pre-installed application is activated (S64).

As described above, activation using the cached XAIT allows the EPG activation wait time upon turning on the main power to be reduced. It is understood that the above-described method allows the activation time for not only an EPG but also other OCAP applications to be reduced.

3.5 Communication Control

According to the OCAP standard, both the OCAP application and the cable card 300 perform IP communication using different MAC addresses. Conventionally, there is IP aliasing that implements a plurality of IP addresses with one ether chip. However with this technique, different MAC addresses cannot be provided.

The receiver 100 manages two IP addresses, one for a cable card and the other for an OCAP application. Those IP addresses are addresses on the same network. Under such circumstances, when an IP packet is transmitted using a socket (SocketAPI), OS (Operating System) assigns an IP address. In this case, a problem may occur that the IP address for the cable card may be assigned to packets transmitted by the OCAP application. To solve the problem, there is a method in which an IP address is explicitly assigned using a socket. In this case, the OCAP application needs to explicitly specify an IP address. However, since the OCAP application is provided by a multiple system operator, it cannot be expected that the OCAP application is always designed to have such a specification.

The following describes a configuration for solving the above-described problems and performing IP communication by providing different MAC addresses respectively to an OCAP application and a cable card, with one ether chip.

Figure 11:
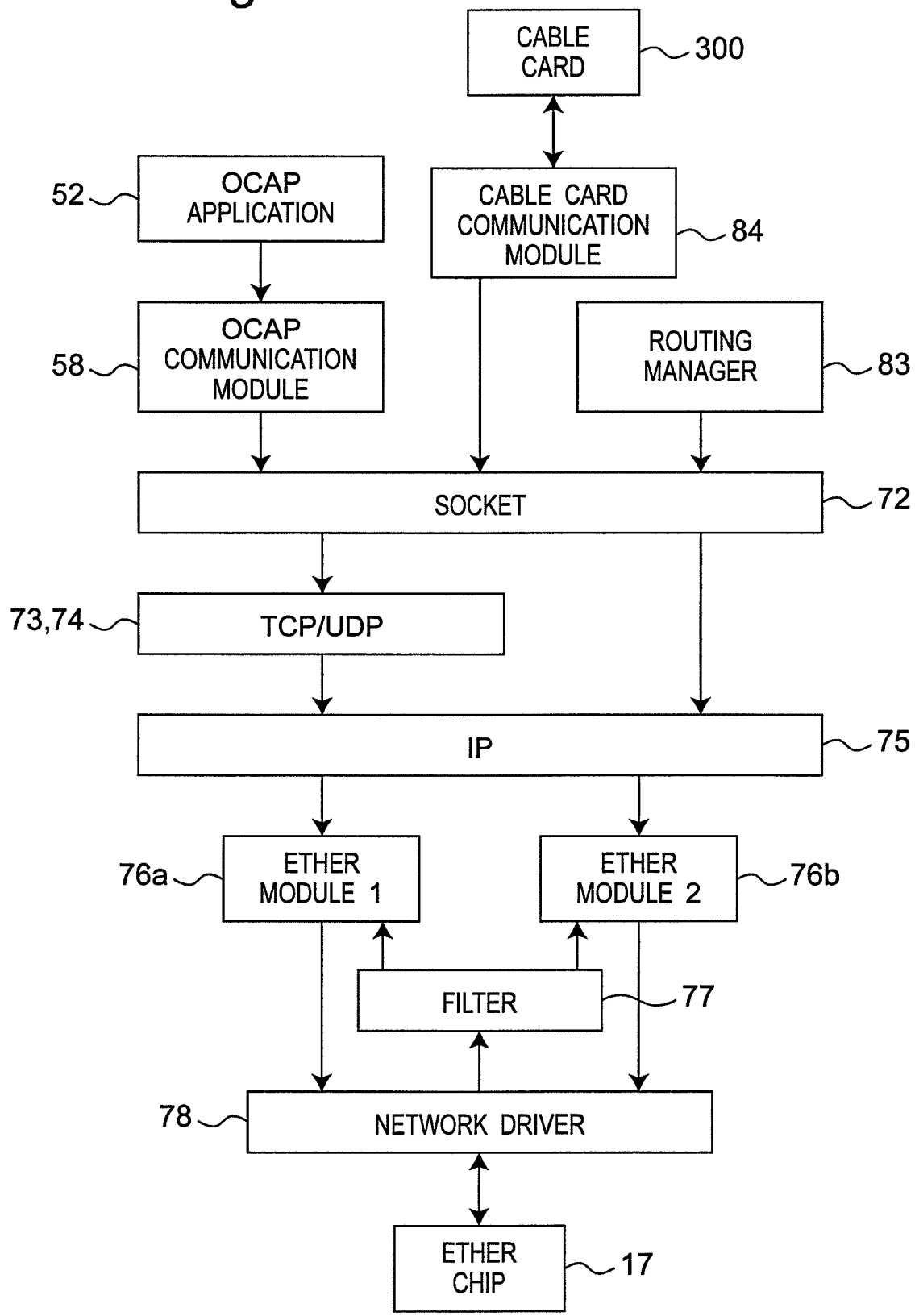
FIG. 11 is a diagram showing more specifically a partial configuration of the receiver related to communication.

FIG. 11 is a diagram showing more specifically a configuration of a portion of the receiver 100 related to communication, in conjunction with FIG. 2.

The receiver 100 has two IP addresses, one for the cable card 300 and the other for an OCAP application. Those IP addresses are addresses on the same network.

The ether module 1 (76a) is a module for controlling transmission/reception of ether packets to/from an OCAP application 52. The ether module 2 (76b) is a module for controlling transmission/reception of ether packets to/from the cable card 300.

Reception of ether packets is described. In the present embodiment, the network driver 78 is set to a promiscuous mode and thus obtains all packets passing therethrough.

The filter 77 obtains in advance and manages a MAC address assigned to the OCAP application 52 and a MAC address assigned to the cable card 300. The filter 77 analyzes headers of all packets obtained by the network driver 78 to extract packets having MAC addresses equal to those of the OCAP application 52 or the cable card 300. Then, the filter 77 transmits the packets having MAC addresses equal to those of the OCAP application 52 to the ether module 1 (76a). On the other hand, the packets having MAC addresses equal to those of the cable card 300 are transmitted to the ether module 2 (76b). This method allows data with two types of MAC address to be received with one ether chip.

Next, a method of assigning an IP address to data from the OCAP application 52 or the cable card 300 is described.

Upon activating the receiver 100, a DHCP client of the receiver 100 inquires a DHCP server about IP addresses of the OCAP application 52 and the cable card 300 with MAC addresses of the OCAP application 52 and the cable card 300 being specified, obtains the inquired two IP addresses, and then registers the obtained IP addresses in the OS. The cable card 300 inquires OS about an IP address of the cable card to obtain the IP address.

A routing manager 83 sets a metric value of the IP address of the cable card 300 to a value higher than a metric value of the IP address of the OCAP application 52, in a routing table. Generally, the OS gives priority to an IP address with a lower metric value for assigning an IP address. Thus, the IP address of the OCAP application 52 is assigned on a priority basis, by making the metric value of the IP address of the OCAP application 52 lower than the metric value of the IP address of the cable card 300.

When transmitting data, the OCAP application 52 transmits data to an OCAP communication module 57 without specifying the IP address thereof and with a destination being specified. The OCAP communication module 57 transmits the data to the socket 72 without specifying an IP address. Since the data from the OCAP application 52 is not provided with an IP address, the OS provides an IP address. At that time, since the metric value of the IP address of the OCAP application 52 is lower than the metric value of the IP address of the cable card 300, the IP address of the OGAP application 52 provided by the DHCP server is certainly assigned by the OS to the data from the OCAP application 52.

On the other hand, the cable card 300 has obtained an IP address from the OS. When transmitting data, the cable card 300 transmits the data to a cable card communication module 84 with a destination and the IP address thereof specified to the data. The cable card communication module 84 transmits the data to the socket 72. Since the IP address is explicitly specified in the data from the cable card 300, an IP address is not provided by the OS.

As described above, an IP address is assigned by the OS for data from the OCAP application 52. The cable card 300 explicitly specifies an IP address thereof to data to be sent from the cable card 300. As such, appropriate IP addresses are provided to the respective data.

By the above-described process, IP communication using a plurality of MAC addresses is enabled with one ether chip. An OCAP application can perform communication with the correct IP address while being unconscious of an IP address.

The above embodiment describes an example in which a cable is used as a transmission medium for broadcast data. The type of transmission medium to which the present invention can be applied is not limited to a cable. Needless to say, the concept of the present invention can be applied to a receiver that receives broadcast data, in which functions are implemented by both a pre-installed application and a downloaded application.

In addition, a receiver to which the concept of the present invention can be applied may be an STB (Set Top Box) in addition to a display device.

INDUSTRIAL APPLICABILITY

The present invention is useful for a receiver such as an STB that receives broadcast data, in which functions are implemented by both a pre-installed application and a downloaded application.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2007-157153, filed on Jun. 14, 2007, of which content is incorporated herein by reference.

What is claimed is:

1. A digital broadcast receiver that (i) implements a first function by a downloaded application obtained through a network and (ii) implements a second function by a pre-installed application, the digital broadcast receiver comprising:
a determining unit that determines whether management information on the downloaded application has been received; and
a menu manager that controls display of a pre-installed menu executed by the pre-installed application, the pre-installed menu being provided by the pre-installed application,
wherein the menu manager includes:
a first section for setting a display setting to indicate whether each of a plurality of predetermined functions should be displayed on the pre-installed menu, the predetermined functions being functions that are used by both the downloaded application and the pre-installed application and including at least one of a caption setting and a PIN (personal identification number) setting; and
a second section for controlling the display of the pre-installed menu such that (i) when the management information has been received, the second section determines whether each of the plurality of predetermined functions is to be displayed on the pre-installed menu according to the display setting, and (ii) when the management information has not been received, all of the predetermined functions are displayed on the pre-installed menu regardless of the display setting.

2. A digital broadcast receiver comprising:
a plurality of input channels;
a first unit for selecting one of the plurality of input channels;
a predetermined processing unit that receives information from the selected input channel;
a second unit that receives a command for switching from the selected input channel to another input channel from among the plurality of input channels;
an input switching unit that switches the selected input channel to the other input channel when the switching command is received;
an application manager that manages execution of a downloaded application obtained through a network;
a key delivery unit that delivers a key code to the downloaded application when the key code is received; and
a resource controller that sends a resource control request to a predetermined resource when the resource control request from the downloaded application is received,
wherein the application manager causes the downloaded application to be executed in a background when the switching command for switching from the selected input channel to the other input channel is received,
wherein the key delivery module prevents transmission of the key code to the downloaded application when the downloaded application is being executed in the background, and
wherein the resource controller discards the resource control request from the downloaded application when the downloaded application is being executed in the background.

3. The digital broadcast receiver according to claim 1, wherein a function of the digital broadcast receiver is provided by an application that complies with OCAP (Open Cable Application Platform) which is a cable broadcast standard.

4. The digital broadcast receiver according to claim 2, wherein a function of the digital broadcast receiver is provided by an application that complies with OCAP (Open Cable Application Platform) which is a cable broadcast standard.

* * * * *